Patented Apr. 18, 1939

2,155,194

UNITED STATES PATENT OFFICE 2,155,194

PREPARATION OF ALPHA-ALKYLAMINO-ACYLOPHENONES

Jonas Kamlet, Brooklyn, N. Y.

No Drawing. Application October 27, 1938, Serial No. 237,280

4 Claims. (Cl. 260—577)

This invention relates to the preparation of alpha-alkylaminoacylophenones and, more particularly, to compounds of the general formula $C_6H_5.CO.CHR.NHR'$, where R represents hydrogen or an alkyl group and R' represents an alkyl group. These compounds are of importance as intermediates in the manufacture of a series of pharmaceutical agents with marked vasoconstrictor and sympathomimetric effects, including dl-epehedrine and phenylmethylaminoethanol.

Heretofore, alpha-alkylaminoacylophenones were prepared exclusively by halogenating an acylophenone and reacting the resultant alpha-haloacylophenone with an excess of alkylamine. Thus, in the preparation of alpha-methylaminopropiophenone, the common procedure heretofore involved brominating propiophenone and reacting the resultant alpha-brompropiophenone with an excess of methylamine. Similarly, in the preparation of methylaminoacetophenone, the first step involved chlorinating (or brominating) acetophenone. As is well known, these alpha-haloacylophenones (such as chloracetophenone and brompropiophenone) are powerful lachrymators and vesicants, and their preparation, isolation and purification is often associated with considerable danger.

Furthermore, in reacting a haloacylophenone with an alkylamine, a considerable excess of the latter must be employed to avoid the formation of tertiary amines (such as $(C_6H_5COCHR)_2NR')$. The recovery of this excess of alkylamine represents an additional complication in the process.

The purpose of this invention is to provide a process for the preparation of alpha-alkylaminoacylophenones in a single step from the corresponding acylophenone without recourse to intermediate production of the noisome and noxious alpha-haloacylophenones. A further purpose is to obviate the necessity of using an excess of alkylamine to avoid the formation of tertiary amines.

As is well known, alkylamines will readily react with halogens, especially in the presence of alkalis, to yield the corresponding alkyl-N-halo-amines. Thus, equimolecular proportions of methylamine, caustic soda and bromine in aqueous solution yield sodium bromide and methyl-N-bromo-amine:

$CH_3H_2 + NaOH + Br_2 \rightarrow NaBr + CH_3NHBr$

These alkyl-N-halo-amines are highly active compounds in which the halogen atoms are electropositive and extremely labile. Thus, for instance, methyl-N-bromo-amine will precipitate iodine from solutions of potassium iodide. They are also comparatively unstable and decompose at advanced temperatures.

I find that alpha-alkylaminoacylophenones may be obtained in a single step by reacting an acylophenone with an alkyl-N-halo-amine in a suitable solvent and in the presence of an alkaline-reacting substance. This reaction may be represented by the following equation:

$C_6H_5.CO.CH_2R + R'.NH.X \rightarrow$
$\qquad C_6H_5.CO.CHR.NH.R' + HX$ where X represents a halogen. By the term "alkaline-reacting substance", I refer to any compound which has in aqueous solution a pH greater than an aqueous solution of an equivalent molality of the alkylaminoacylophenone being prepared. Such compounds include the hydroxides and carbonates of ammonia and the alkali metals, the oxides and hydroxides of the alkali-earth metals, the quaternary tetra-alkyl ammonium hydroxides and the alkylamines, proper.

This reaction may be carried out as follows:

A halogen (e. g., bromine) is added in small portions to a well-cooled aqueous or alcoholic solution of one mole of alkylamine and one mole of alkali-metal hydroxide (or two moles of alkylamine) until one mole of the halogen has been dissolved. The temperature of the solution must not exceed 10° C. during this addition. One mole of acylophenone dissolved in a miscible solvent such as alcohol, is now added and the mixture is agitated at a temperature below 15° C. while adding slowly a solution of one mole-equivalent of an alkaline-reacting substance. After stirring for two hours, the reaction mixture is neutralized to litmus with hydrochloric acid, diluted with water and unreacted acylophenone is extracted with ether. From the aqueous residue (which comprises a solution of alpha-methylaminopropiophenone hydrochloride) the free base may be obtained in the usual manner by alkalinization and extraction with an organic solvent.

Alternately, an aqueous solution of alkyl-N-halo-amine and an alkaline-reacting substance (e. g., alkylamine) may be agitated with an acylophenone dissolved in a water-immiscible solvent, such as benzene, at a temperature not exceeding 25° C. for two hours. By dissolving the reagents in mutually immiscible solvents, the strongly exothermic reaction is somewhat moderated and a simple means is provided for separating the final end-products of the reaction.

The following examples are intended to define and illustrate this invention, but in no way limit it to the reagents, proportions or conditions described therein. Obvious modifications will occur to any person skilled in the art. Both examples are drawn to the preparation of alpha-methylaminopropiophenone, from which dl-ephedrine (1 - phenyl,2 - methylaminopropanol) may be obtained in almost quantitative yield by catalytic hydrogenation.

Example I

Bromine is added in small portions to a well-cooled solution of 35.0 grams of methylamine and 40.0 grams of caustic soda in one liter of 95% alcohol at −5° C., until a total of 160.0 grams (50.3 cc.) has been added. The temperature of the solution should never be allowed to exceed 10° C. during the course of the addition. 135.0 grams of propiophenone is now added and the mixture is agitated while a cold solution of 40.0 grams of caustic soda in 50 cc. of water is added in a thin stream.

After stirring for two hours at a temperature not exceeding 15° C., the alcohol is distilled off under vacuum and the residue is dissolved in two liters of a 1N aqueous solution of hydrochloric acid. Unchanged propiophenone is extracted with two successive 250 cc. portions of ether and the residual acid-aqueous solution of alpha-methylaminopropiophenone hydrochloride is neutralized to litmus with a concentrated sodium carbonate solution. It may now be submitted directly to reduction, e. g. by hydrogenation at 3 to 4 atmospheres pressure in the presence of a catalyst consisting of palladium or platinum deposited on animal charcoal, or of activated Raney nickel.

Example II

Bromine is added to a well-cooled solution of 95.0 grams of methylamine in one liter of water at −5° C., in small portions until a total of 160.0 grams (50.3 cc.) has been added. The temperature of the solution should never be allowed to exceed 10° C. during the course of the addition. 135.0 grams of propiophenone dissolved in one liter of benzene is now added and the mixture is vigorously agitated for two hours with efficient external cooling to keep the temperature below 25° C.

The components of the reaction mixture are now allowed to stratify and the aqueous solution of methylamine hydrobromide is separated from the benzene solution of alpha-methylaminopropiophenone. The latter is neutralized to litmus with a concentrated alcoholic solution of hydrochloric acid and the crystalline precipitate that forms is removed by filtration. By solution in alcohol and reprecipitation with acetone, white crystals of alpha-methylaminopropiophenone hydrochloride, melting at 179° C. are obtained.

The following alpha-alkylaminoacylophenones have been prepared by this method $C_6H_5.CO.CHR.NHR'$

| R | R' | Melting point of hydrochloride |
|---|---|---|
|  |  | Degrees |
| Hydrogen | Methyl | 219 |
| Do | Ethyl | 228 |
| Methyl | Methyl | 179 |
| Do | Ethyl | 182 |
| Do | n-Propyl | 182 |
| Do | Iso-propyl | 212 |
| Do | n-Butyl | 159 |
| Do | n-Amyl | 154 |
| Ethyl | Methyl | 191 |
| Do | Ethyl | 196 |
| n-Propyl | Methyl | 181 |

Having described my invention, what I claim and desire to protect by Letters Patent is:

1. A process for the preparation of alpha-alkylaminoacylophenones which comprises reacting a compound of the general formula $C_6H_5.CO.CH_2R$ with a compound of the general formula $R'.NH.X$, wherein R is a member of a group consisting of hydrogen and alkyl groups, R' represents an alkyl group and X represents a halogen, in the presence of a member of the group of alkaline-reacting substances consisting of the hydroxides and carbonates of ammonia and the alkali metals, the oxides and hydroxides of the alkali earth metals, the quaternary tetra-alkylammonium hydroxides and the alkylamines.

2. A process for the preparation of alpha-alkylaminoacylophenones which comprises reacting equimolecular proportions of alkylamine, alkali metal hydroxide and halogen, at a temperature below 10° C., to form an alkyl-N-haloamine, and reacting the latter with a compound of the general formula $C_6H_5.CO.CH_2R$, wherein R is a member of the group consisting of hydrogen and alkyl groups, in the presence of a member of the group of alkaline-reacting substances described in claim 1, at a temperature below 25° C.

3. A process for the preparation of alpha-alkylaminoacylophenones which comprises reacting two mols of alkylamine with one mol of halogen, at a temperature below 10° C., to form an alkyl-N-haloamine, and reacting the latter with a compound of the general formula $C_6H_5.CO.CH_2R$, wherein R is a member of the group consisting of hydrogen and alkyl groups, in the presence of a member of the group of alkaline-reacting substances described in claim 1, at a temperature below 25° C.

4. A process for the preparation of alpha-alkylaminoacylophenones which comprises reacting with a compound of the general formula $C_6H_5.CO.CH_2R$, wherein R is a member of the group consisting of hydrogen and alkyl groups, at a temperature below 25° C., the products obtained by the interaction of at least three mols of alkylamine with one mol of halogen, at a temperature below 10° C.

JONAS KAMLET.